Aug. 11, 1964 F. L. COX 3,144,150
BOAT TRAILER INCORPORATING COLLAPSIBLE SLEEPING QUARTER
Filed March 12, 1962 3 Sheets-Sheet 1
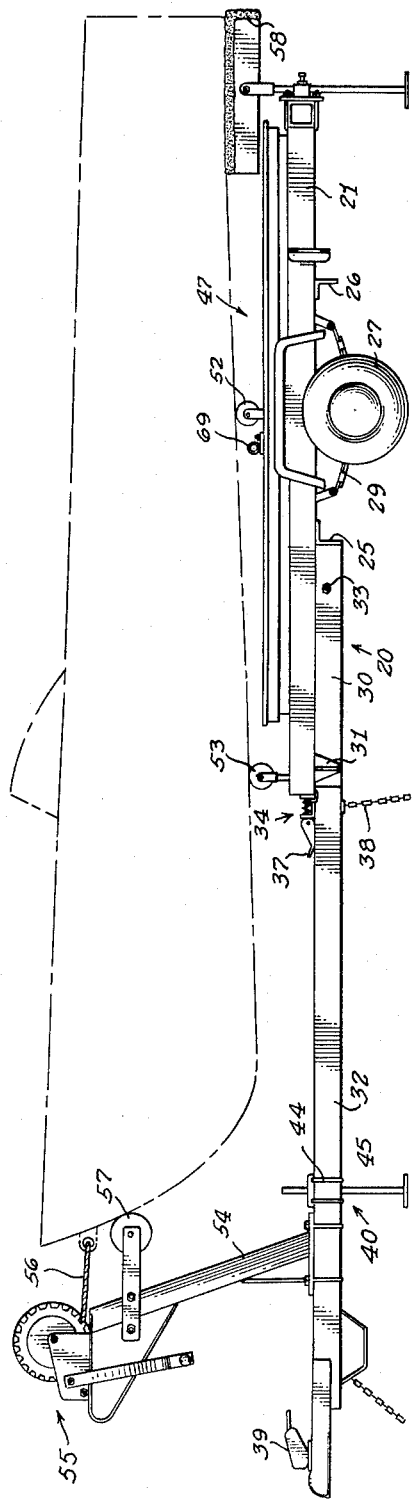
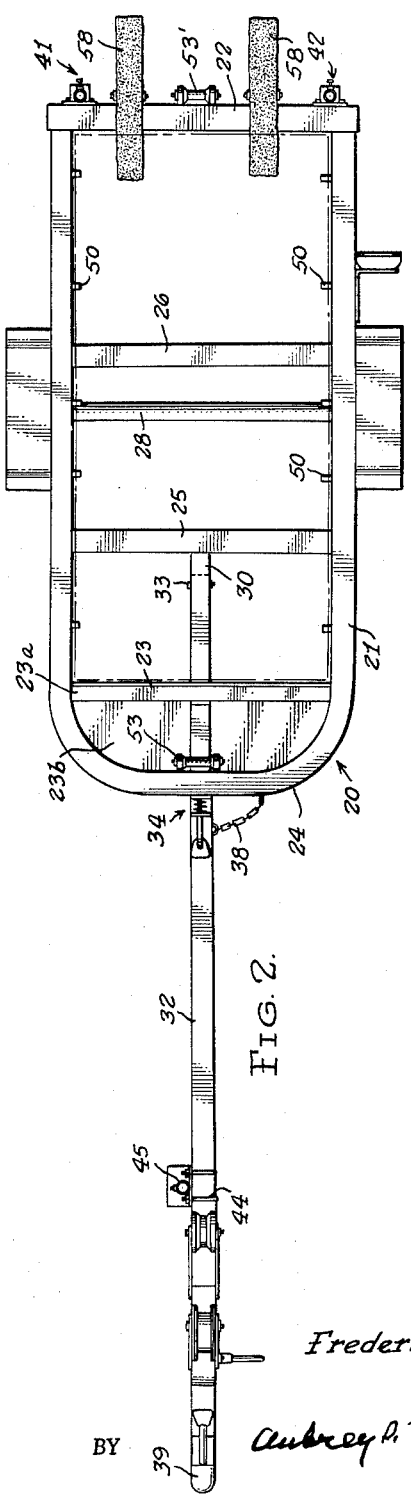
INVENTOR
*Frederick L. Cox*
BY *Aubrey A. McFadyen*
ATTORNEY

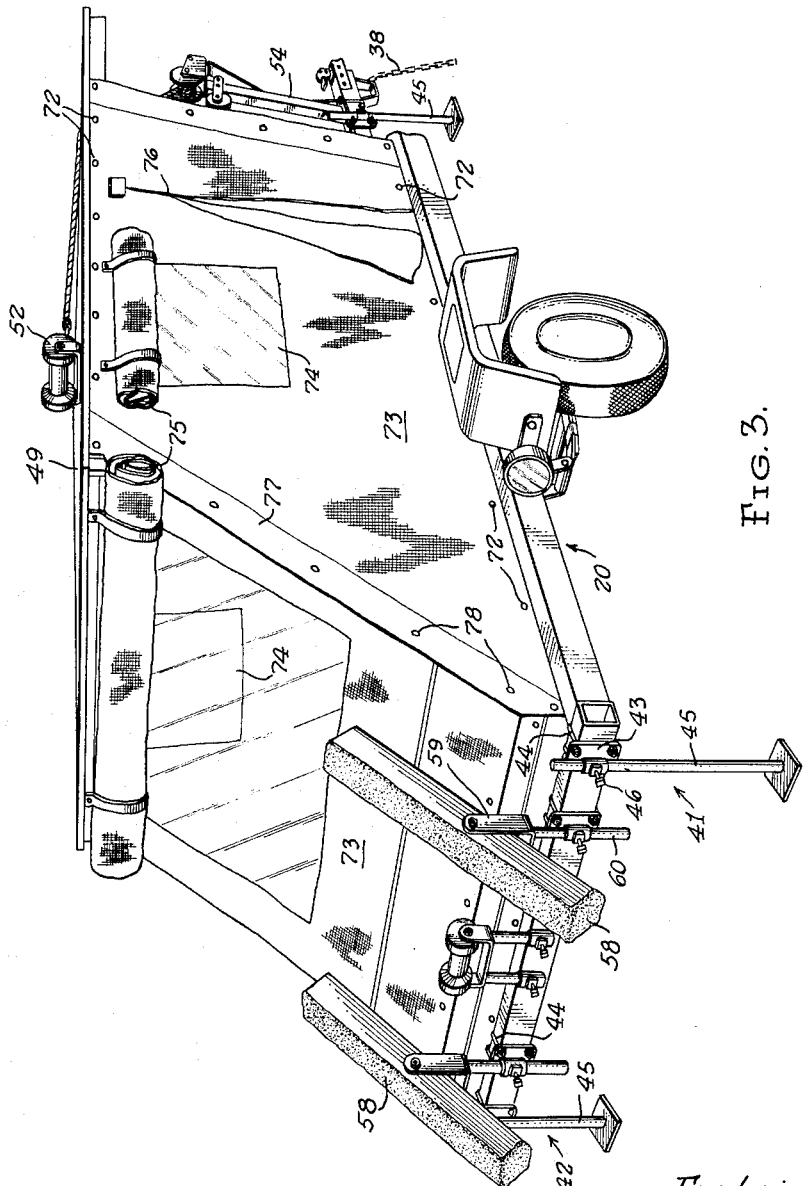

Aug. 11, 1964     F. L. COX     3,144,150
BOAT TRAILER INCORPORATING COLLAPSIBLE SLEEPING QUARTER
Filed March 12, 1962     3 Sheets-Sheet 3
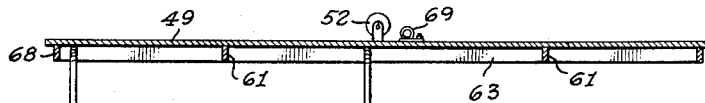
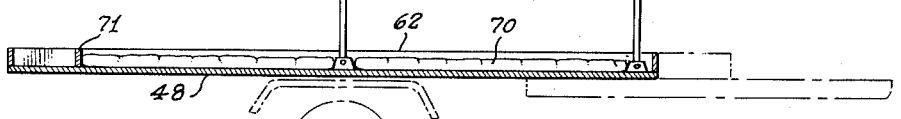
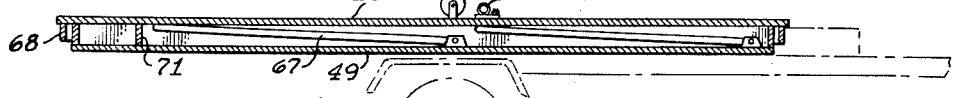
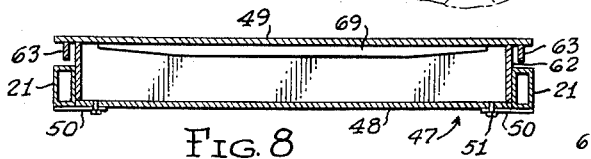
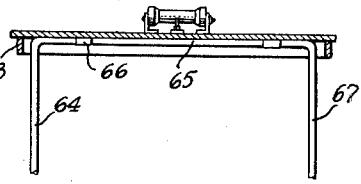
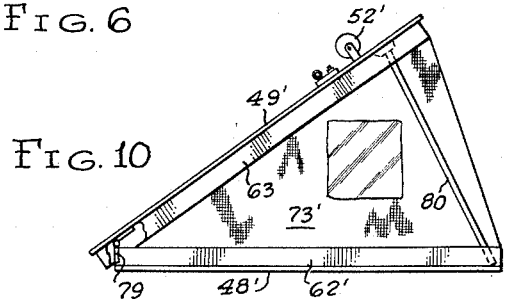
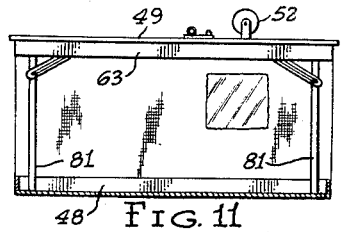
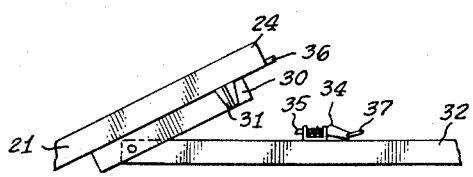
INVENTOR
*Frederick L. Cox*
BY *Aubrey D____*
ATTORNEY

United States Patent Office 3,144,150
Patented Aug. 11, 1964

3,144,150
BOAT TRAILER INCORPORATING COLLAPSIBLE SLEEPING QUARTER
Frederick L. Cox, Grifton, N.C.
Filed Mar. 12, 1962, Ser. No. 179,038
7 Claims. (Cl. 214—505)

This invention relates to trailers of the type disclosed in the United States patent to Okey, No. 2,977,010 adapted to be detachably connected to and drawn by automotive vehicles, and more particularly this invention relates to trailers for transporting a boat, wherein the trailer includes collapsible boat supporting sleeping facilities mounted directly on the trailer frame.

While there has been considerable development in recent years in the field of boat trailers, few inventors have proposed incorporating sleeping accommodations on the trailer itself, and in the instances where the provision of sleeping accommodations on a boat trailer has been attempted, the result has not been commercially feasible by reason of the bulkiness and unsightliness of the structures proposed, in the difficulties in opening and collapsing the same, or the excessive weight and expense thereof.

With the foregoing in mind, it is the primary object of the present invention to provide a boat trailer which incorporates a compact sleeping structure fixedly positioned on the frame of the trailer and adapted to support the boat during transportation thereof, said structure, after removal of the boat, being readily expansible by raising the upper wall thereof for defining sleeping facilities therebelow on the trailer.

Another object of the present invention is to provide a boat trailer wherein the structure incorporated for defining the sleeping quarter may be easily opened up for sleeping purposes, as well as collapsed, by one person.

Still another object of the present invention is to provide a boat trailer incorporating collapsible structure openable to define sleeping accommodations and which structure is neat in design, sturdy in construction, simple in operation, economical to manufacture and assemble, and has marked utility for sportsmen.

A still further object of this invention is to provide a boat trailer of the kind aforementioned wherein the structure defining the sleeping quarter may be fabricated from conveniently obtainable, relatively inexpensive parts of light weight, whereby a trailer incorporating the above-mentioned sleeping facility may be offered at an attractive price.

Yet another object of this invention is to provide a trailer of the kind aforementioned involving minimal modification of the conventional trailer structure and utmost simplicity of the sleeping facility.

Further objects and advantages of the present invention will become apparent from the following description and claims, and from the accompanying drawings, wherein:

FIGURE 1 is a view in side elevation of a trailer equipped with a collapsed sleeping quarter according to the present invention and showing in dotted outline a boat position on said quarter for transport;

FIGURE 2 is a plan view thereof, with the boat removed, the sleeping quarter being outlined in dotted lines;

FIGURE 3 is a perspective rear view showing the sleeping quarter in erected position, with curtains applied;

FIGURE 4 is a detail section running lengthwise the box structure defining the sleeping quarter, with the cover portion thereof shown in raised position;

FIGURE 5 is a view corresponding to FIGURE 4, but with the box structure collapsed as for reception of a boat thereon;

FIGURE 6 is a transverse detail through the bottom portion of the box structure showing portions of the linkage arrangement which inter-connects the bottom and cover portion of the box structure, as regards its connection to said bottom portion;

FIGURE 7 is a view corresponding to FIGURE 6 and showing the structure of the links as connected to the cover portion;

FIGURE 8 is a transverse section through the trailer frame, showing the collapsed sleeping quarter disposed within said frame;

FIGURE 9 is a detail of the tilt lock arrangement between the frame of the trailer and its tongue;

FIGURE 10 is a side elevation of a modification of the box structure defining the sleeping quarter; and FIGURE 11 is a side elevation of a still further modification of the box structure.

In general, the present invention consists in fixedly positioning a collapsible shallow box sleeping structure or quarter upon the frame of a conventional type boat trailer. The sleeping quarter, as illustrated, is comprised of a shallow rectilinear box structure, in the bottom portion of which may be disposed a mattress, covers, curtains, etc., and the surplus space within the foot end of the box structure is divided to provide carrying space for trailer and camping equipment. A sturdy and rigid cover normally overlies and closes the box structure when collapsed, as well as serving as a support for a boat during transportation thereof. After removal of the boat, the cover may be elevated, as by operation of a winch mounted on the trailer tongue, or otherwise, whereupon the cover serve as a roof above the lower or bottom portion of the box.

Referring now to the drawings, wherein like reference characters designate the same or like parts throughout, reference numeral 20 represents generally the trailer comprising the present invention. The trailer includes a horizontal frame 21 including a front section of U-form in plan, the open rear end of which section is closed by a rigid cross bar 22 which is fixedly joined to the ends of said front section. An iron 23 of L-shape in cross-section is disposed between and fixedly joined at its ends to the inner side portions of said front section near the medial arcuate portion 24 thereof, with one wall 23a of said angle iron disposed substantially flush with the lower surface of said frame. Second and third angle irons 25, 26 extend across the side pieces of said frame and are secured to the bottom face thereof. A plate 23b, preferably of marine plywood is fitted into the space between angle iron 23 and medial portion 24 of the frame. The straight edge portion of the plate rests upon the wall 23a and the curved portion thereof is supported by portion 24 of the frame. The arrangement thus provides a carrying space for trailer equipment.

The frame is supported on a pair of parallel wheels 27 mounted on opposite ends of an axle 28. Leaf springs, as 29, are mounted on the axle and attached to the frame in a conventional manner.

An elongate inverted channel member 30 of generally

U-shape in cross-section is disposed beneath and extends lengthwise frame 21 from a point adjacent its front end into abutment with the vertical wall of angle iron 25. Member 30 is welded to the underside of frame 21 and underside of angle iron 23, while its inner end is welded to the vertical wall of the front angle iron 25. A pair of spaced cart iron brace units 31 are secured to the underside of frame 21 and engage opposite side walls of the outer end of member 30. Member 30 serves as a connector and guide for a tongue 32. The tongue has one end shaped to correspond with the channel of member 30, and a pivot pin 33 passes through both the inner end portion of the tongue and the channel member, whereby the frame may be tilted about axle 28 to facilitate taking on or removing of the boat, as will hereinafter appear.

A tilt lock structure 34 is provided on the tongue (FIGURE 9) for locking the frame and tongue in alignment. This lock means consists of a pin 35 spring biased to normally overlie a lug 36 on the frame 24. Upon raising the free end of lever 37 the pin is withdrawn from lug 36, permitting the frame to tilt. As a safety device, a chain 38 is anchored at one end to tongue 32 and any selected link thereof may be applied to a hook on the frame. The extent of the tilting movement of the the frame may thus be limited by the particular link applied to the hook. During transport of a boat, a link will be selected which will prevent material tilting of the frame in the event of accidental release of the lock pin.

The free end of the tongue is provided with a hitch unit 39 for connecting the trailer with a towing vehicle. For maintaining or stabilizing the frame in horizontal position when disconnected from the towing vehicle, even over irregular ground, the tongue is provided with a vertically adjustable leg 40, and similarly the rear cross bar 22 is provided with a pair of spaced, laterally adjustable like devices 41, 42 (FIGURE 3). Each leg unit includes a plate 43 having openings for receiving the ends U-clamp elements 44, for fixing the unit in selected position. A vertical tube section 45 is fixed to each plate, and its respective leg extends through the tube section and may be locked in vertical position by means of a headed threaded element 46.

It will be noted that the side members of the frame as described above, together with the front and rear frame pieces 22, 23 define an open elongate rectangular area. Within this area (see FIGS. 2 and 8) is disposed a shallow box structure 47 of substantially the size and shape of said area. By the term "shallow" is meant a box having an interior depth on the order of 6 to 9 inches. The box structure is comprised of a lower walled bottom portion 48 and a cover portion 49 normally overlying the bottom portion. The bottom portion of the box structure rests upon the cross pieces 25, 26 of the frame. Additional support for the box structure is provided in the form of spaced lugs 50 secured to the bottom of the frame and projecting into said area. The bottom of the box structure is illustrated as secured to said cross pieces and lugs by bolts 51.

Box structure 47 performs the dual role of supporting a boat during transportation thereof, and on removal of the craft, the cover portion of the box structure may be elevated to provide a roof above bedding disposed on the floor of the bottom portion. For the role first referred to, one or more keel rollers 52 are mounted upon the cover portion, the number and spacing of such rollers depending upon the weight and length of the boat, as well as the dimension of the box structure. An additional roller 53 is mounted on the front medial portion 24 of frame 20 and a like roller 53 is mounted on cross bar 22.

A winch stand 54 is fitted on tongue 32 for adjustment therealong, and said stand carries a winch device 55 for use in pulling a boat onto the keel rollers 52, 53'. The winch includes a crank for drawing in the cable 56 in a way common in boat trailers. When the boat is thus drawn onto the trailer the winch may be latched to tether the boat to stand 54. A vertically adjustable spool type rubber roller 57 is fixed to the winch stand for engaging and protecting the bow of the craft.

Spaced bunkers 58 are mounted on rear cross bar 22 of the frame for both lateral and vertical adjustment in order to properly engage the bottom of the stern of the boat for stabilizing the craft during transportation. Bunkers are conventionally of the roller or the bar type, and the selection for a given situation depends largely upon the size and weight of the craft. In the drawing, bar type bunkers are shown for purposes of illustration. Each bunker is pivotally mounted at or near its midpoint in a U-shaped bracket 59 atop an adjustable supporting rod 60. The boat contacting face of each bunker is padded to protect the boat and at the same time assure snug contact therewith. The described arrangement permits the bunkers to readily pivot to make contact throughout its length with the boat. The pivotal connection of the bunkers offers sufficient friction that they will remain in any position to which they are shifted. Therefore in raising cover portion 49 it is unnecessary to bother to tilt the bunkers, as this will be effected by the cover structure itself. Similarly, in lowering the cover structure, the latter will restore the bunkers to boat stabilizing position.

Since the cover portion of the box structure is to support a boat thereon, it especially, should be of rigid, sturdy material. For this purpose I have found marine plywood especially suitable by reason of its strength, water resistance, durability, lightness and relatively low cost. A ½ inch sheet of such material has been found suitable in the arrangement herein described for supporting up to an 800 pound craft. The cover section may be reinforced by struts 61 secured to the underside thereof to add further to its strength.

As indicated, the box structure is comprised of a bottom portion or section 48 having upstanding side walls 62, and a cover portion or section 49 having adjacent its periphery walls 63 similar to those of the bottom portion, but extending downwardly only sufficiently to prevent rain from beating into said box structure. The vertical wall portions of the cover section also adds additional strength to the cover section. Since bottom section 48 rests within formerly unused space of the frame, a boat supported upon the cover portion is less than six inches above the position it assumes when supported directly upon the same type of frame.

The cover portion 49 is arranged to be swung up to a position above the bottom portion 48, and to this end in the preferred embodiment a plurality of linkage units are provided within the box structure. Each linkage unit is shown in the form of a metal structure 64 of U-shape, with the central portion 65 being straight and of a length to substantially span the interior width of the bottom portion. The straight portion 65 is pivotally connected by U-shaped straps 66 to the under side of the cover portion. The straight portions of the linkages thus additionally brace the cover portion. The arrangement described is such that when the box structure is closed the legs 67 are inclined upwardly (FIGURE 5) whereby an endwise and/or upward pull on the cover portion will cause the latter to swing upwardly. The rear end wall 68 of the cover portion (FIGURE 5) is spaced sufficiently from the rear wall of the bottom portion so that they will not catch during the cover elevating operation.

To facilitate elevating the cover portion, a lifting eye 69 is anchored to the center area thereof, to be connected to the cable 56 of the winch structure. It will be seen that when the box is collapsed the winch is disposed above the plane of the cover portion, whereby the initial pull exerted by the cable is upwardly and lengthwise the cover portion.

The third floor area of the bottom portion of the box structure serves as a bed for a mattress or pad 70, as well as storage space for the several curtain panels employed in enclosing the sleeping area when the cover portion is in raised position. The surplus space at the foot of the bed may be partitioned off as indicated at 71, for reception of boat, trailer and/or camping equipment.

As shown best in FIGURE 3 the vertical wall portions of both the bottom and cover portions are provided with fastening devices 72 complementing those on the curtain section panels 73. The vertical wall portions 63 of the cover portion are disposed inwardly from the edge of the cover portion. The cover portion thus overhangs the fastening devices and prevents rain from running down inside the curtain panels. Screen windows 74, with roll covers 75 are provided, as well as zippered openings 76 for entry and egress of the campers. To assure against leakage, the edges of the inclined end curtains are provided with flap portions 77 which overlap and are snap fastened at 78 to the side curtain panels.

In setting up the sleeping facilities described above, the winch may be operated to pull the cover portion upwardly and forwardly of the trailer, as indicated in FIGURE 4. When the cover is about three-quarters way up, the winch may be locked by the dog element thereof, and the curtain panels applied in slack condition. Thereafter the winch may be further operated until the curtains are drawn reasonably taut, whereupon the winch is locked, thus maintaining the structure in place. No braces or stops are necessary or involved.

The form of the invention pictured in FIGURE 10 represents an extreme simplification or economy version of the basic invention. In this form the box structure is essentially the same as in the preferred form. The cover portion 49', however, is hinged at 79 to the front end wall of bottom portion 48' to be swung upwardly to the position shown by means of the winch and cable means previously described. The cover portion may be sustained in raised position by locking the winch, as previously described, or by employing a rod or stick 80 after the fashion used in holding up a piano top. Curtains are provided likewise for the sides and open end of this form of the invention. It is manifest that this form of the invention offers savings in curtain material as well as in eliminating the linkage mechanism.

A second modification of the invention is schematically illustrated in FIGURE 11. Here the box structure is identical with that shown in and described in the first form of the invention, save that the linkage system has been replaced by foldable legs 81, one leg being at each corner of the cover portion. The upper end of each leg is pivoted to the under side of the cover portion, and may be folded within the confines of the cover portion. Link brace elements 82 of conventional design interconnect the cover portion and legs to render the cover portion stable when in the position shown. Though the cover portion is on the order of eight or more feet in length, one person can elevate it for camping by first raising one end of the cover portion to approximately camping position and while so sustaining it, lowering or opening out the adjacent pair of legs. The lowered legs of the cover portion will sustain it in the position just accomplished, and the camper then may move to the opposite end of the cover portion and proceed as before indicated.

While the apparatus herein disclosed constitute preferred forms of the invention, it is to be understood that the apparatus is capable of mechanical alteration without departing from the spirit of the invention. Therefore, such commercial adaptations as fall within the scope of the appended claims are intended to be included herein, and no limitation is to be placed on the invention except as defined by the scope of the appended claims.

Having fully set forth and described this invention, what is claimed and desired to be secured by Letters Patent is:

1. A camping and boat transporting trailer comprising a horizontal wheeled frame, tongue means fixed to one end of said frame for attachment to a towing vehicle, a shallow box structure including a bottom portion fixedly mounted on said frame, said bottom portion defining a bed for a mattress and including rigid upstanding side and end walls, a rigid boat receiving cover portion normally resting upon said upstanding walls, pairs of rigid linkages, each linkage pivotally interconnecting said cover and bottom portions at spaced points, said linkages in the closed condition of said box structure being upwardly inclined at an acute angle, and pull means on said tongue above the level of said cover portion and connected by cable to the center area of said cover portion, whereby said cover portion, on operation of said pull means, will be swung upwardly to a position above and parallel with said bed and supported by said linkages.

2. The apparatus as defined in claim 1 wherein curtain fastener elements are provided on said upstanding walls and said cover portion of said box structure, and further including fabric curtains provided with fastener elements for cooperating with those on the box structure.

3. The apparatus as defined in claim 1, wherein one or more keel rollers are mounted upon said cover portion for receiving a boat thereon when in lowered position, and said frame is provided with adjustable bunker devices for engagement with the under portion of the stern of said boat for stabilizing the latter.

4. The apparatus as defined in claim 1 wherein each of said pairs of linkages is comprised of a U-shaped structure, the medial portion of each being straight and substantially spanning said box portion and being clamped against the under side of said cover portion for pivotal movement, with the ends of the leg portions pivotally connected to the bottom portion of said box.

5. A camping and boat transporting trailer comprising a horizontally disposed wheeled elongate frame, towing attachment means on one end of said frame for connection to a towing vehicle, a shallow elongate box structure including a bottom portion fixedly mounted on said frame, said bottom portion defining a bed for a mattress and including upstanding side and end walls, a flat, one-piece rigid, boat-sustaining cover portion normally resting directly in horizontal position upon the upper edges of said upstanding walls, one or more keel rollers mounted on said cover portion for receiving a boat thereon when in said normal position, vertically adjustable bunker devices mounted on said frame rearwardly of said box structure for engagement with the under portion of the stern of said boat for stabilizing the latter, means for elevating said cover portion after removal of the boat therefrom comprising means cooperating with said cover portion and bottom portion and operable upon endwise movement of said cover portion in one direction relative to said bottom portion to move the cover portion upwardly above said bottom portion to raised horizontal camping position, and manipulable means for imparting endwise movement to said cover portion for elevating same to said camping position.

6. The apparatus as defined in claim 5, wherein said last-named manipulable means comprises a winch mounted on said towing attachment means and having a line selectively connectible to a boat for hauling same onto said cover portion, or for connection to said cover portion for imparting endwise movement thereto.

7. A camping and boat transporting trailer comprising a horizontally disposed U-shaped frame, a shallow box structure of a depth on the order of the thickness of a mattress positioned between the legs of said frame, said box structure including a bottom section having upstanding edge walls and a horizontal, rigid, one-piece boat-sustaining cover section, normally resting directly on the upper edges of said upstanding walls, said bottom section being supported by members extending across the under side of said frame, a mechanical system within said box structure and interconnecting both side edge portions of said bottom section and cover section and operative upon end-wise movement of said cover section relative to said bottom section to shift said cover section upwardly while maintained in horizontal position to a camping position above said bottom section, and manipulable means selectively connectible to a boat to pull same onto said cover section, when the latter is in said normal position or to said cover section for imparting endwise movement thereto.

References Cited in the file of this patent

UNITED STATES PATENTS

| | | |
|---|---|---|
| 2,216,553 | Green et al. | Oct. 1, 1940 |
| 2,845,663 | Harr | Aug. 5, 1958 |
| 2,853,338 | Stanley | Sept. 23, 1958 |
| 2,881,023 | Gile et al. | Apr. 7, 1959 |
| 2,926,947 | Green | Mar. 1, 1960 |
| 2,977,010 | Okey | Mar. 28, 1961 |
| 3,013,836 | Groh | Dec. 19, 1961 |